United States Patent
Nakamura et al.

(10) Patent No.: US 6,985,424 B1
(45) Date of Patent: Jan. 10, 2006

(54) LASER MODULE AND OPTICAL HEAD

(75) Inventors: Shigeru Nakamura, Tachikawa (JP);
Kazuo Shigematsu, Yoshikawa (JP);
Toshimasa Kamisada, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/913,943

(22) PCT Filed: Aug. 4, 1999

(86) PCT No.: PCT/JP99/04206

§ 371 (c)(1),
(2), (4) Date: Aug. 20, 2001

(87) PCT Pub. No.: WO01/11615

PCT Pub. Date: Feb. 15, 2001

(51) Int. Cl.
*G11B 7/00* (2006.01)

(52) U.S. Cl. ............... 369/121; 369/44.11; 369/44.14; 369/44.37

(58) Field of Classification Search ............ 369/121, 369/44.11, 53.15, 44.37, 44.12, 44.14
See application file for complete search history.

(56) References Cited

U.S. PATENT DOCUMENTS

| 5,406,543 | A | | 4/1995 | Kobayashi | |
| 5,600,619 | A | * | 2/1997 | Takekoshi et al. | 369/44.12 |
| 6,552,990 | B1 | * | 4/2003 | Kajiyama et al. | 369/44.14 |
| 6,646,975 | B1 | * | 11/2003 | Uchizaki et al. | 369/44.12 |

FOREIGN PATENT DOCUMENTS

| EP | 0803867 | | 10/1997 |
| JP | 4-123343 | | 4/1992 |
| JP | 10-021577 | | 1/1998 |
| JP | 10021577 A | * | 1/1998 |
| JP | 10-027374 | | 1/1998 |
| JP | 10027374 A | * | 1/1998 |
| JP | 10-213723 | | 8/1998 |

* cited by examiner

*Primary Examiner*—David Ometz
*Assistant Examiner*—Jorge L. Ortiz-Criado
(74) *Attorney, Agent, or Firm*—Antonelli, Terry, Stout & Kraus, LLP

(57) ABSTRACT

An optical head in which a plurality of semiconductor laser chips are adhered on a mount surface perpendicular to the tracking servo direction of a focusing lens. Fluctuation of an optical spot power is reduced even if the tracking servo is performed by the optical head having dispersion of an inner surface direction when a plurality of the semiconductor laser chips are mounted. In FIG. 1, a plurality of the semiconductor laser chips 4a and 4b are arranged so as to have a mounting direction which is substantially perpendicular to the tracking servo direction of the focusing lens.

11 Claims, 11 Drawing Sheets

(a)

(b)

(AA' SECTION)

(a)

(b)

(a)

(b)

BB' SECTION (a)

(b)

(a)

(b)

(a)

(b)

LASER MODULE AND OPTICAL HEAD

TECHNICAL FIELD

The present invention relates to a laser module, an optical head or an optical information recording and reproduction apparatus that are used when recording information to an optical information medium such as an optical disk or when reproducing the information from the optical information medium. More particularly, the present invention relates to a laser module, an optical head or an optical information recording and reproduction apparatus that mounts a plurality of light sources.

BACKGROUND ART

In addition to smaller and thinner size, various kinds of functions are required to an optical information recording and reproduction apparatus such as an optical disk drive or unit.

In a conventional normal optical disk unit using one light source, a high-speed data transfer is desired since information validation after the information has been recorded is performed by rotating a disk again, which leads to a slow data transfer speed. In Japanese Patent Laid-Open 64-70936 gazette, a multi-beam type optical head is suggested in which two semiconductor laser chips are arranged in an optical head in a opposing manner, two parallel beams are formed by the same collimating lens, the two beams are made to be incident to a focusing lens, two optical spots are radiated on the same track on an optical disk surface, and the information recording and reproduction for the information validation are performed at a substantially same time. In the multi-beam type head, the two light sources perform the recording and the reproduction for the recording validation, and thus the disk does not need to be rotated again for the recording validation. In the example of JP-A-64-70936, a high output laser beam source and an optical system having a high optical efficiency for radiating a laser beam from the light source on the disk efficiently are necessary. On the other hand, the optical efficiency of the optical system may be low regarding a laser beam performing the reproduction of the information. Accordingly, a device that accomplishes the high optical efficiency only for the leaser beam performing the information recording is sufficient.

Moreover, a requirement has been increasing in recent years that both of a CD-R (Compact Disk-Recordable) that has spread as a writable optical disk and a DVD (Digital Versatile Disc/Digital Video Disc) developed as a writable optical disk in higher density need to be recorded/ reproduced with the same small optical head. Since a laser wavelength suitable for the recording/reproduction of the CD-R is approximately 780 nm while a laser wavelength suitable for the recording/reproduction of the DVD is approximately 660 nm, both of the laser beam source having the wavelength of 780 nm and the laser beam source having the wavelength of 660 nm needs to be mounted on the same optical head. For example, in JP-A-10-241189 and JP-A10-289468, small optical heads are suggested in which a semiconductor laser chip for a compact disk having the wavelength of approximately 780 nm, a semiconductor laser chip for a DVD having the wavelength of approximately 660 nm and a photodetecting element are formed in a unit. Normally, beams having different radiation points pass the different positions of the lens system. Similarly, in the optical heads, the beams radiated from the two semiconductor laser chips are made to be incident to the different positions of a focusing lens. Then, optical paths of the two beams are unified by using a transmissive hologram (grating) in JP-A-10-241189 and synthesis means by a polarizable prism (birefringent plate) or a hologram in Japanese Patent Laid-Open 10-289468. Furthermore, FIG. 6 of JP-A-10-289468 and FIG. 3 of JP-A-10-261240 show that the beam position from the laser beam source arranged outside an axis and the beam position from the laser beam source arrange on the axis are unified in the vicinity of the focusing lens by allowing the distance between the laser beam source, the collimating lens and the focusing lens to be substantially equal.

DISCLOSURE OF THE INVENTION

However, the laser beam radiated from the semiconductor laser chip does not have an even optical intensity distribution but has the optical intensity distribution having high intensity at the central portion of the beam. Accordingly, even if the optical paths of a plurality of the laser beams are unified as in the foregoing example, the central position of the optical intensity distribution of the laser beam is off from the center of the focusing lens in the case where the semiconductor laser chip is mounted in a tilted manner. Thus, the optical efficiency of the optical head system reduces. Therefore, in the optical head and optical disk unit using a plurality of the semiconductor laser beams for the information recording, the arrangement of optical parts needs to be decided such that the reduction of the optical efficiency for each laser beam is minimized taking into consideration the direction of an angle shift and its accuracy that occurs when the semiconductor laser chip is mounted.

Furthermore, the optical disk unit and the like perform tracking servo in which the focusing lens and the like is moved in the radius direction of the optical disk such that the optical spot accurately scans the track of the optical disk. Thus, the central position of the optical intensity distribution is off from the center of the focusing lens even by the tracking servo, and thus the optical efficiency of the optical head system changes. Then, an optical head is necessary whose optical efficiency is hard to be changed due to the tracking servo. Accordingly, the arrangement of the optical parts needs to be decided such that the fluctuation of the optical efficiency for each laser beam is minimized taking into consideration the direction of the focusing lens movement and the like for the tracking servo.

The object of the present invention is to solve the foregoing problems in the laser module and the optical head or the optical information recording and reproduction apparatus that are used for recording the information to the optical information medium or reproducing the information by using a plurality of the laser beam sources, and to provide the laser module and the optical head or the optical information recording and reproduction apparatus in which the optical efficiency reduction and change of each laser beam are minimum for the angle shift occurred when attaching the semiconductor laser chip or the focusing lens movement for the tracking servo.

To achieve the foregoing objects, in the optical head that comprises: a plurality of the laser beam; optical convergence means such as the focusing lens for converging a plurality of the laser beams radiated from the laser beam sources into the optical spot on the optical information medium such as the optical disk; and tracking servo means such as a lens actuator for moving the optical convergence means in a tracking servo direction perpendicular to a track direction such that the optical spot accurately scans the track of the optical information medium, a first aspect of the present invention is that a plurality of the laser beam sources are a plurality of the semiconductor laser chips and a mount surface for the laser chips on which a plurality of the semiconductor laser chips are mounted is arranged to be substantially perpendicular to the tracking servo direction. Herein, in the case where the optical path reflects and refracts due to a reflection plane and a refraction plane in the optical path from the laser beam sources to the optical convergence means, the reflection plane and the refraction plane can be removed to make the optical path straight if the optical convergence is substituted with an image formed by the reflection plane and the refraction plane, and the image of the optical convergence means can be projected in a space same as that of the laser beam sources. The above-described term "substantially perpendicular" means that the mount surface for the laser chips is arranged to be perpendicular to the tracking servo direction of the image of the optical convergence means when the reflection plane and the refraction plane are removed to project the image of the optical convergence means in the space same as that of the laser beam sources.

In a second aspect of the present invention, the optical head comprises: a first reflection plane formed by etching or the like for reflecting the laser beam radiated from a plurality of the semiconductor laser chips; and a second reflection plane such as a mirror for guiding the laser beam from the first reflection plane to the optical convergence means, in which the first reflection plane is formed on a plate such as silicon or the like that is same as the mount surface for the laser chips.

Further, in a third aspect of the present invention, the optical information recording and reproduction apparatus in which the laser beams from the first reflection plane is made to be incident from the tracking servo direction to the second reflection plane, and a plurality of the semiconductor laser chips are arranged in an inner plane direction parallel to an optical information medium plane.

Moreover, in a fourth aspect of the present invention, the optical information recording and reproduction apparatus in which the laser beams from the first reflection plane is made to be incident from the track direction to the second reflection plane, and a plurality of the semiconductor laser chips are arranged in an inner plane direction perpendicular to the optical information medium plane.

In a fifth aspect of the present invention is the laser module that consists of: a plurality of the semiconductor laser chips; photodetecting element that receives the laser beams radiated from a plurality of the semiconductor laser chips; and a package that encloses a plurality of the semiconductor laser chips and the photodetecting element, and the optical head or the optical information recording and reproduction apparatus using the laser module that consists of: the optical convergence means such as the focusing lens for converging the laser beams radiated from the laser module into the optical spot on the optical information medium such as the optical disk; and the tracking servo means such as a lens actuator for moving the optical convergence means in a tracking servo direction perpendicular to the track direction such that the optical spot accurately scans the track of the optical information medium, in which the mount surface for the laser chips on which a plurality of the semiconductor laser chips are mounted is arranged to be substantially perpendicular to the tracking servo direction. Herein, "substantially perpendicular" means as described above.

Further, in a sixth aspect of the present invention, the mount surface for the laser chips for attaching a plurality of the semiconductor laser chips is provided on a semiconductor plate such as silicon where the photodetecting element is formed on the surface, and the first reflection plane formed by etching or the like is provided for reflecting the laser beams radiated from a plurality of the semiconductor laser chips, and then the second reflection plane such as the mirror is arranged for guiding the laser beams radiated from the laser module to the optical convergence means.

Still further, in a seventh aspect of the present invention, the optical information recording and reproduction apparatus in which the laser beams from the first reflection plane is made to be incident from the tracking servo direction to the second reflection plane, and a plurality of the semiconductor laser chips are arranged in the inner plane direction parallel to the optical information medium plane.

Still further, in a eighth aspect of the present invention, the optical information recording and reproduction apparatus in which the laser beams from the first reflection plane is made to be incident from the track direction to the second reflection plane, and a plurality of the semiconductor laser chips are arranged in the inner plane direction perpendicular to the optical information medium plane.

Still further, a ninth aspect of the present invention is the laser module that comprises: the semiconductor plate such as silicon; the mount surface for the laser chips provided on the semiconductor plate; a plurality of the semiconductor laser chips mounted on the mount surface for the laser chips; the reflection plane formed by etching or the like provided on the semiconductor plate for reflecting the laser beams radiated from a plurality of the semiconductor laser chips; the photodetecting element, which is provided on the semiconductor plate, for receiving the laser beams radiated from a plurality of the semiconductor laser chips; and the package having an approximate cubic shape whose length in a horizontal direction is longer than that in a vertical direction and that radiates the laser beam in a thickness direction, the package having lead wires on both sides in a longitudinal direction as the horizontal direction and enclosing the semiconductor plate at its substantially central position, in which the semiconductor plate is enclosed in the laser module such that a plurality of the semiconductor laser chips are arranged in a vertical direction perpendicular to the longitudinal direction as the horizontal direction of the package.

Still further, a ninth aspect of the present invention is the laser module that comprises: the semiconductor plate; the mount surface for the laser chips provided on the semiconductor plate; a plurality of the semiconductor laser chips mounted on the mount surface for the laser chips; the reflection plane provided on the semiconductor plate for reflecting the laser beams radiated from a plurality of the semiconductor laser chips; and the photodetecting element, which is provided on the semiconductor plate, for receiving the laser beams radiated from a plurality of the semiconductor laser chips, in which the photodetecting elements are arranged at both sides of a plurality of the semiconductor laser chips in a direction where a plurality of the semiconductor laser chips are arranged.

Still further, in a tenth aspect of the present invention, the laser module comprises the package for enclosing the semiconductor plate, in which the outline of the package in a plane perpendicular to a direction, where the laser beam is radiated from the package, has an approximate rectangular shape in a degree where its long direction and short direction can be distinguished, and a plurality of semiconductor laser chips and the photodetecting element are arranged in a direction of the short side of the package.

Still further, an eleventh aspect of the present invention is the laser module that comprises: the semiconductor plate; the mount surface for the laser chips provided on the semiconductor plate; a plurality of the semiconductor laser chips mounted on the mount surface for the laser chips; the reflection plane provided on the semiconductor plate for reflecting the laser beams radiated from a plurality of the semiconductor laser chips; and the photodetecting element, which is provided on the semiconductor plate, for receiving the laser beams radiated from a plurality of the semiconductor laser chips, in which the semiconductor plate includes a plurality of pads for electrically connecting with an external electronic circuit and a plurality of the pads are arranged along a side of the semiconductor plate parallel with a direction where a plurality of the semiconductor laser chips are arranged.

Still further, in a twelfth aspect of the present invention, the laser module comprises a plurality of the lead wires for electrically connecting the package for enclosing the semiconductor plate with the external electronic circuit, in which the outline of the package in a plane perpendicular to a direction, where the laser beam is radiated from the package, has the approximate rectangular shape in a degree where its long direction and short direction can be distinguished, and a plurality of the lead wires are arranged in a direction of the short side of the package.

Other aspects of the present invention include a laser module used for an optical head constituting an optical information recording and reproduction apparatus, which performs tracking servo to record and reproduce the information when an optical spot is radiated on an optical information medium, and including optical convergence means for converging laser beams into the optical spot on the optical information medium, the laser module, comprising a light source where each of semiconductor laser chips having a plurality of wavelengths is mounted on its surface, a photodetecting element for receiving each of a plurality of the laser beams radiated from each of the laser chips, and a package for enclosing the light source and the photodetecting element, wherein the surface where a plurality of the semiconductor laser chips are mounted is substantially perpendicular to the tracking servo direction.

A laser module comprising a semiconductor plate, a mount surface for laser chips provided on the semiconductor plate, a plurality of semiconductor laser chips mounted on the mount surface for the laser chips, a reflection plane provided on the semiconductor plate for reflecting laser beams radiated from a plurality of the semiconductor laser chips, and a photodetecting element, which is provided on the semiconductor plate, for receiving the laser beams radiated from a plurality of the semiconductor laser chips, wherein the photodetecting elements are arranged at both sides of a plurality of the semiconductor laser chips in a direction where a plurality of the semiconductor laser chips are arranged.

A laser module comprising a package for enclosing the semiconductor plate, wherein the outline of the package in a plane perpendicular to a direction, where the laser beam is radiated from the package, has an approximate rectangular shape in a degree where its long direction and short direction can be distinguished, and a plurality of semiconductor laser chips and the photodetecting element are arranged in a direction of the short side of the package.

A laser module comprising a semiconductor plate, a mount surface for laser chips provided on the semiconductor plate, a plurality of semiconductor laser chips mounted on the mount surface for the laser chips, a reflection plane provided on the semiconductor plate for reflecting laser beams radiated from a plurality of the semiconductor laser chips, and a photodetecting element, which is provided on the semiconductor plate, for receiving the laser beams radiated from a plurality of the semiconductor laser chips, wherein the semiconductor plate includes a plurality of pads for electrically connecting with an external electronic circuit and a plurality of the pads are arranged along a side of the semiconductor plate parallel with a direction where a plurality of the semiconductor laser chips are arranged.

A laser module comprising a plurality of the lead wires for electrically connecting a package for enclosing the semiconductor plate with an external electronic circuit, wherein the outline of the package in a plane perpendicular to a direction, where the laser beam is radiated from the package, has the approximate rectangular shape in a degree where its long direction and short direction can be distinguished, and a plurality of the lead wires are arranged in a direction of the short side of the package.

BEST MODE FOR CARRYING OUT THE INVENTION

Figure 1:
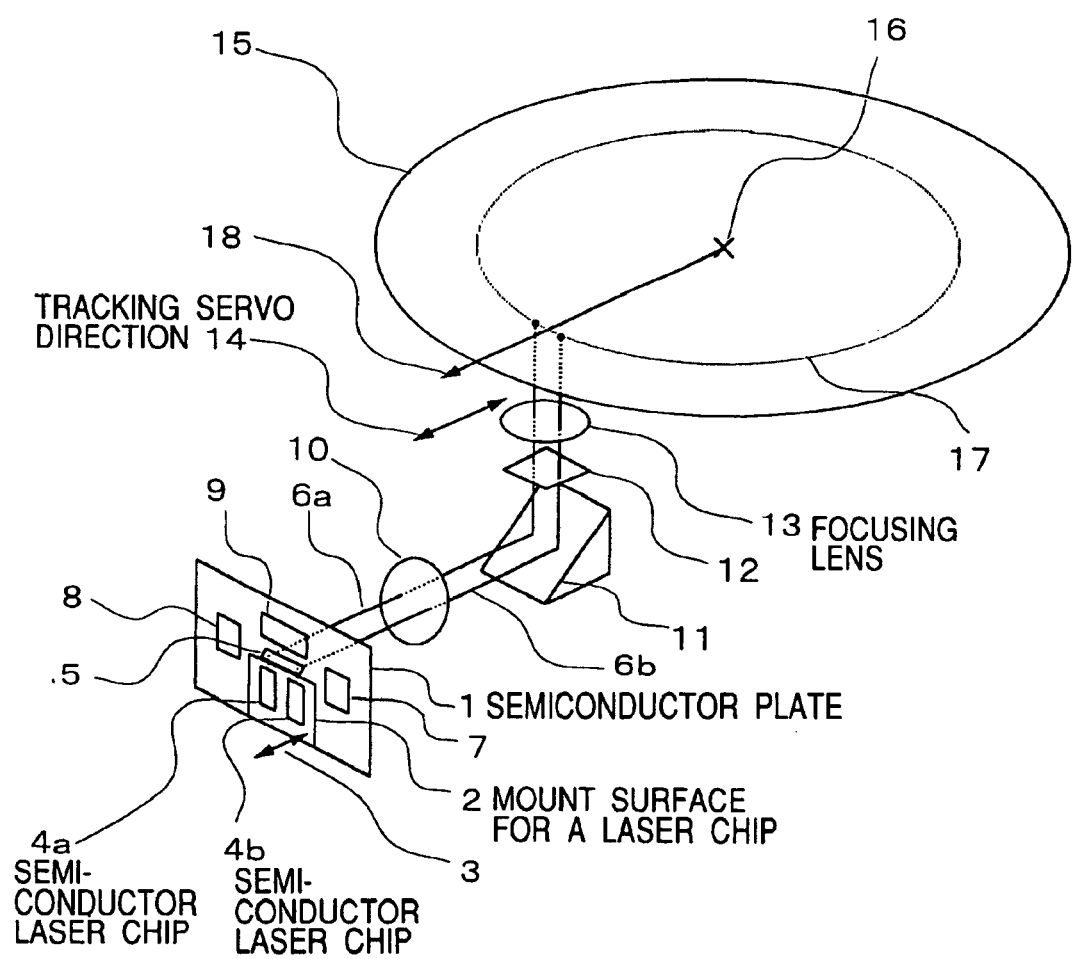
FIG. 1 is a view showing a constitution of a first embodiment of an optical disk unit and an optical head according to the present invention.

Firstly, the terms used in the description will be shown by making them correspond with reference numerals.

1: semiconductor plate, 2: mount surface for laser chip, 3: normal direction, 4a or 4b: semiconductor laser chip, 5: semiconductor mirror surface, 6a and 6b: laser beam, 7: photodetecting element, 8: photodetecting element, 9: photodetecting element, 10: collimating lens, 11: mirror, 12: composite element, 13: focusing lens, 14: tracking servo direction, 15: optical disk, 16: optical disk rotation center, 17: track, 18: optical disk radius direction, 20: laser beam (6a or 6b), 21 and 22: boundary line, 31a and 31b: reflection position on semiconductor mirror (5) surface, 32a: laser beam having wavelength λa, 32b: laser beam having wavelength λb, 33: conductive thin film, 34: pad, 35: amplifier, 41: package, 42: lead wire, 43: base, 44: glass cover, 45:

reflection plane, 51: optical axis, 52: entrance pupil plane, 53a and 53b: central beam, 54a and 54b: contour, 55a, 55b and 56: optical efficiency, 61: semiconductor plate, 62: mount surface for laser chip, 63: normal direction, 65: semiconductor mirror, 66a or 66b: laser beam, 73: conductive thin film, 74: pad, 75: amplifier, 81: package, 82: lead wire, 83: base, 84: glass cover, 85: reflection plane, 91: lens holder, 92: spring, 93: holding block, 94: coil, 95: magnet, 96: side plate portion, 97: surface of optical head case, 101: case of optical disk unit, 102: motor, 103: shaft, 104: optical head, 105: lens actuator, 106: access mechanism, 107: rail, 111: case of optical disk unit, 115: lens actuator, and 114: optical head.

In the following, the first embodiment of the present invention will be described by using FIG. 1 to FIG. 5.

Figure 9:
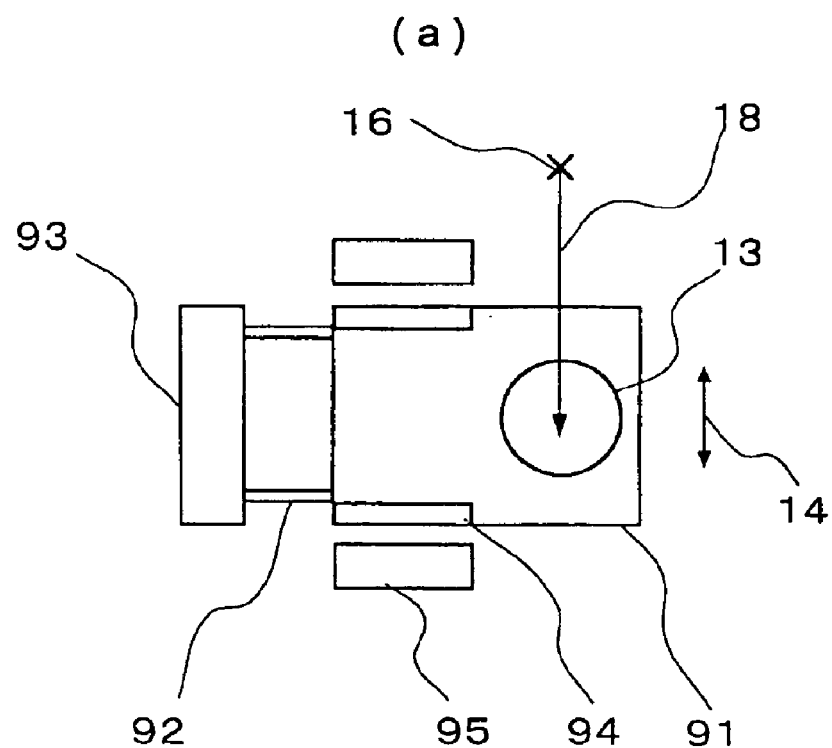
FIG. 9 is a view showing a constitution of a lens actuator in the second embodiment.
Figure 9:
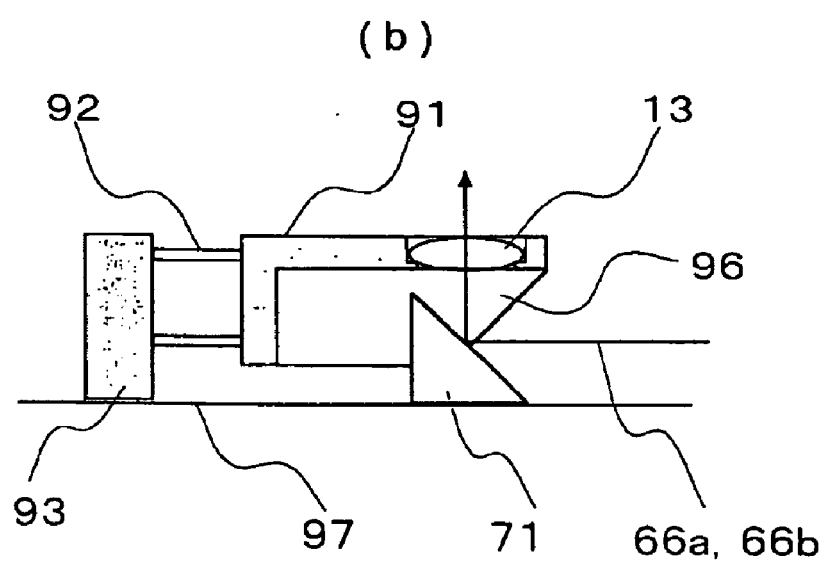

FIG. 1 shows the basic constitution of the optical disk unit and the optical head using the present invention. Reference numeral 1 denotes the semiconductor plate where the photodetecting elements, the electronic circuit and the like are formed on its surface, the laser chips and the like are mounted thereon, and silicon or the like is preferable, for example. In FIG. 1, the front surface of the semiconductor plate 1 cannot be seen actually because it is arranged facing its rear surface to a viewer, but the drawing shows in a phantom state where the plate is seen from the rear surface to the front surface. 2 denotes the mount surface for the laser chips, which is formed by engraving the surface of the semiconductor plate 1 in the depth of approximately 30 $\mu$m to 100 $\mu$m by etching processing or the like, and the mount surface for the laser chips 2 is parallel with the surface of the semiconductor plate 1. The arrow 3 shows the normal direction of the mount surface for the laser chips 2. 4a denotes the semiconductor laser chip for the DVD, which radiates the laser beam 6a having the wavelength $\lambda a=660$ nm, and 4b denotes the semiconductor laser chip for the CD-R, which radiates the laser beam 6b having the wavelength $\lambda a=780$ nm. The semiconductor laser chips 4a and 4b are adhered to the mount surface for the laser chips 2 by soldering or the like. 5 denotes the semiconductor mirror surface formed between the surface of the semiconductor plate 1 and the mount surface for the laser chips 2, which can be simultaneously formed with the mount surface for the laser chips by etching processing or the like. The laser beam 6a for the DVD, after radiated from the semiconductor laser chip 4a to an upward direction of FIG. 1, is reflected by the semiconductor mirror surface 5, and becomes a parallel luminous flux by the collimating lens 10. 7 denotes the photodetecting element that obtains a focusing error detection signal, 8: the photodetecting element that obtains a tracking error detection signal and an information reproduction signal, 9: photodetecting element that monitors a light emission amount of the semiconductor laser chips 4a and 4b, and 7, 8 and 9 are severally formed on the surface of the semiconductor plate 1. 11 denotes the mirror that radiates the laser beams 6a and 6b on an information medium. 12 denotes the composite element in which a polarization four-division grating and a quarter-wave plate are adhered into a unit, which is arranged facing the four-division grating to the semiconductor laser chip. The polarization four-division grating is made of, for example, a birefringent plate optical crystal plate or a liquid crystal plate, which transmits an incident light without diffraction when it is an ordinary light and functions as the grating when it is an extraordinary light. 13 denotes the focusing lens, and a lens with variable entrance pupil diameter, a lens added with a hologram element on an incident side, a lens added with the hologram element and a zone groove on the lens surface of the incident side, or the like can be used so as to be suitable for both of the optical disk for the DVD, which has a plate thickness of 0.6 mm, a working wavelength of 660 nm and a numerical aperture of 0.6, and the optical disk for the CD-R and CD, which has a plate thickness of 1.2 mm, a working wavelength of 780 nm and a numerical aperture of 0.5. 15 denotes the foregoing optical disk for the DVD and optical disk for the CD-R and CD. 16 denotes the rotation center of the optical disk 15, the circle 17 in a dotted line show the track to which information is recorded, and 18 denotes the radius direction of the optical disk 15. Since the track 17 is displaced to the direction of 18 by the rotation of the optical disk, the tracking servo is required to make the optical spot of the laser beams 6a and 6b track the track 17. Accordingly, although not shown in FIG. 1, the focusing lens 13 is displaced by the lens actuator or the like shown in FIG. 9 in the tracking servo direction shown by the reference numeral 14 by the use of electromagnetic force. In this embodiment, a projected image in the tracking servo direction is reflected by the mirror 11 and the semiconductor mirror 5 to unify the normal direction 3 of the mount surface for the laser chips 2. Specifically, the mount surface for the laser chips 2 for mounting the semiconductor laser chips 4a and 4b is substantially perpendicular to the tracking servo direction 14. Further, as illustrated, the semiconductor laser chips 4a and 4b are mounted in a side-by-side mounting arrangement with respect to one another so that an alignment or mounting direction thereof extends substantially perpendicular to the tracking servo direction 14, and similarly, the optical spots formed by the respective laser beams 6a and 6b on the optical disk 15 so as to be spaced from one another along a direction of the track 17 are arranged so that a line extending therebetween extends or has an alignment direction which is substantially perpendicular to the tracking servo direction 14.

Figure 2:
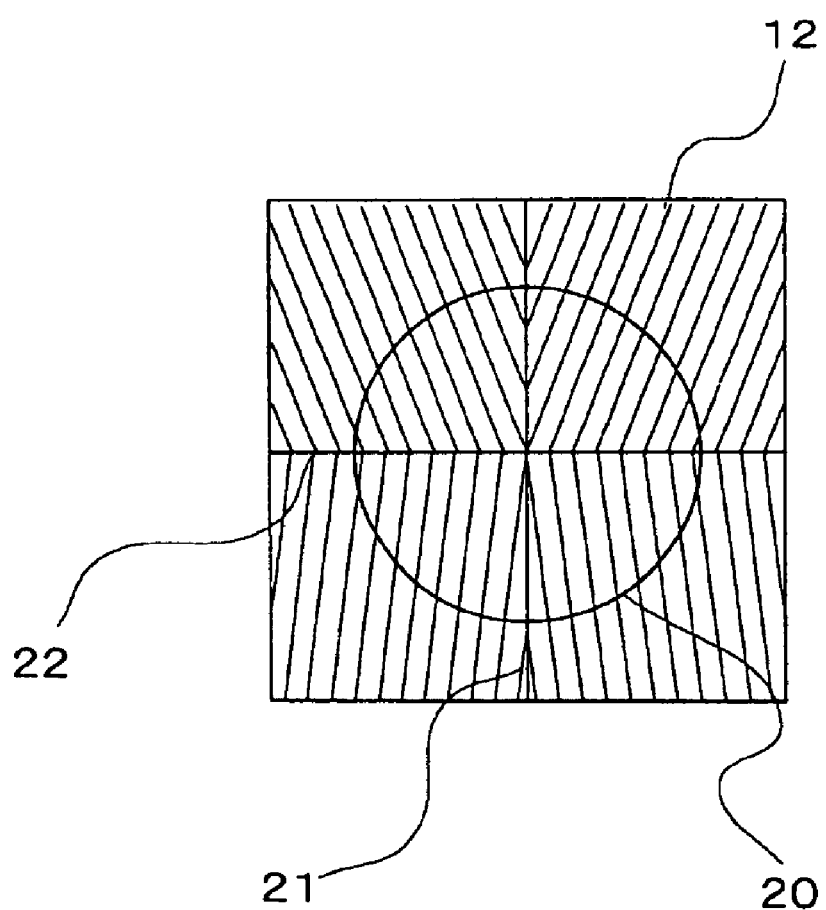
FIG. 2 is a view explaining the operation of a grating portion of a composite element in the first embodiment.
Figure 3:
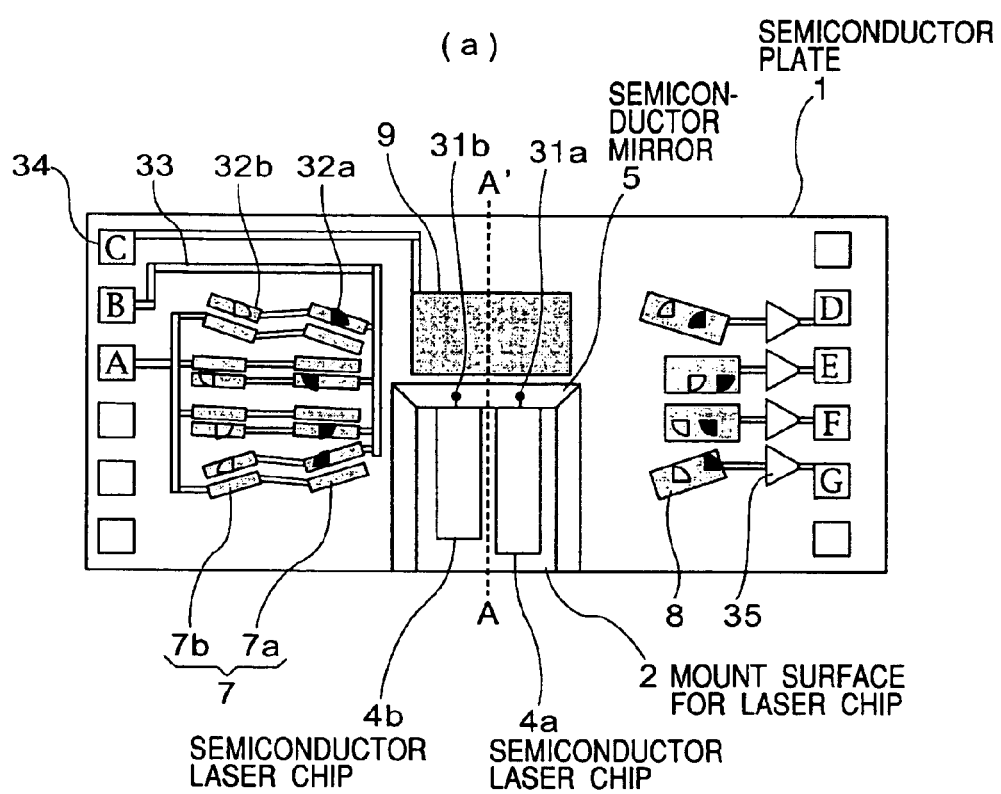
FIG. 3 is a view showing a constitution of a semiconductor plate in the first embodiment.
Figure 3:
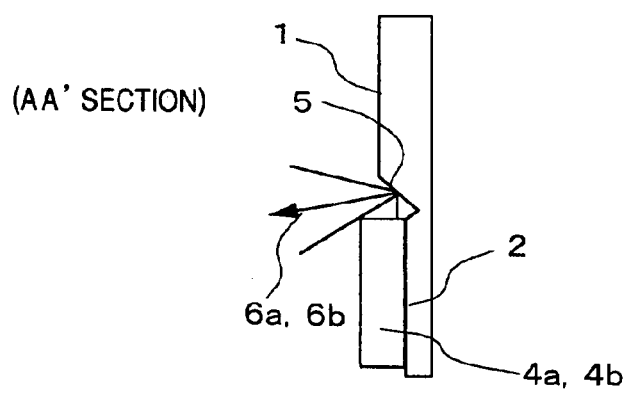
Figure 4:
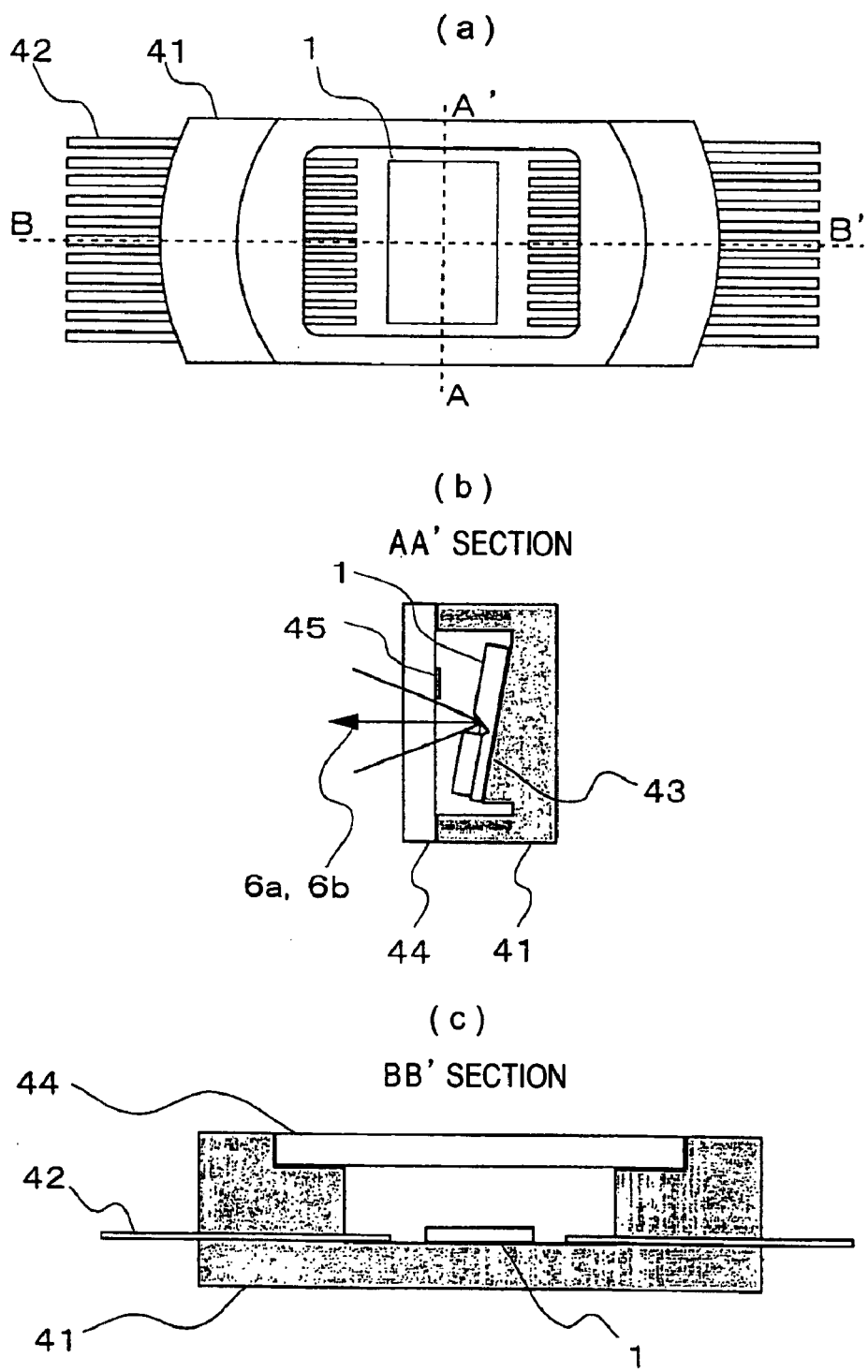
FIG. 4 is a view showing a constitution of a package in the first embodiment.
Figure 5:
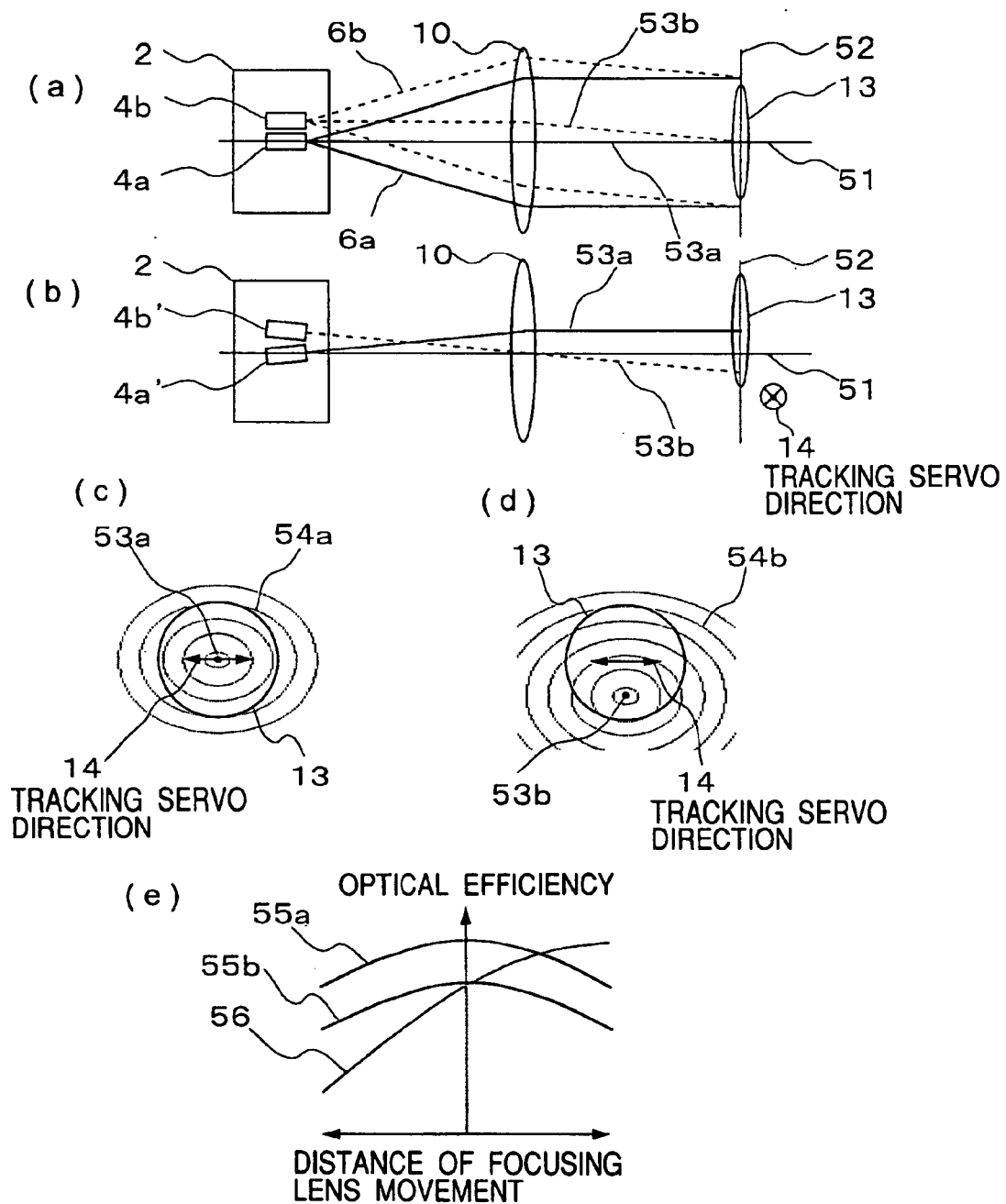
FIG. 5 is a view explaining a principle of the present invention.

In this embodiment, the laser beams 6a and 6b radiated from the semiconductor laser chips 4a and 4b, in the case of being incident to the composite element 12 made of the polarization four-division grating and the quarter-wave plate; are incident to the composite element 12 as the ordinary light and transmit the polarization grading portion without diffraction, and then forms a circular polarization. The laser beams 6a and 6b reflected by the optical disk become the extraordinary light by the quarter-wave plate of the composite element 12 and diffracted by the polarization four-division grading. FIG. 2 shows an example of the grating pattern of the four-division grading of the composite element 12, which is divided into four areas by the boundary lines 21 and 22. The circle 20 shows the laser beam 6a or 6b that is separated into four pieces of + primary diffraction light and four pieces of – primary diffraction light by the four-division grating.

FIG. 3(a) shows the surface of the semiconductor plate 1 seen from the collimating lens 10 side. The eight pieces of quarter circles painted in black shown by the reference numeral 32a show the laser beams of the wavelength $\lambda a$, which are separated by the grating, and the eight pieces of quarter circles that are not painted shown by the reference numeral 32b show the laser beams of the wavelength $\lambda b$, which are separated by the grating. 7 denotes the photodetecting element for obtaining the focusing error detection signal that consists of eight strap type photodetecting elements 7a for receiving the laser beams 32a of the wavelength $\lambda a$ and eight strap type photodetecting elements 7b for receiving the laser beams 32b of the wavelength $\lambda b$. A knife edge method (Foucault method) by the four-division beams is used as a focusing error detecting method, a signal for subtraction is obtained from an A terminal and a B terminal of the wire bonding pad 34 when the photodetecting elements are connected by the conductive thin film 33 such as aluminum as shown in the drawing. 8 denotes the photodetecting elements for obtaining the tracking error detection signal and the information reproduction signal, and the output signal of the four photodetecting elements 8 goes through the amplifiers to be output from D, E, F and G terminals of the pad 34. 9 is the photodetecting element for monitoring the emission amount of the semiconductor laser chips 4a and 4b, and the output signal of the photodetecting element 9 is output from a C terminal of the pad 34. The points 31a and 31b show the reflection positions of the laser beams 6a and 6b on the semiconductor mirror 5 surface, which are radiated from the semiconductor laser chips 4a and 4b. For example, if the grating pitch P of all four areas shown in FIG. 2 are equal, the directions of the gratings to the vertical line 21 are '$\alpha$, $-\alpha$, $+3\alpha$ and $-3\alpha$ degrees, and the focal distance of the collimating lens is fc, the laser beam 32a of the wavelength $\lambda$a separated by the grating is converged on the position with the gap of $2\alpha$ degrees from the center, on a circumference with a radius Ra=fc*$\lambda$a/P having the center on the point 31a. In the same manner, the laser beam 32b of the wavelength $\lambda$b separated by the grating is converged on the position with the gap of $2\alpha$ degrees from the center, on a circumference with a radius Rb=fc*$\lambda$b/P having the center on the point 31b. Presuming that a light emission point gap D of the semiconductor laser chips 4a and 4b as the gap between the points 31a and 31b is substantially D≈fc*($\lambda$b−$\lambda$a)/P, the convergence position of the laser beam of the wavelength $\lambda$a and the convergence position of the laser beam of the wavelength $\lambda$b can be substantially unified. Thus, the beams having the different wavelengths can commonly use the same photodetecting elements and amplifiers, and not only the surface of the semiconductor plate 1 can be saved, that is, the surface can be smaller, but also the number of the wire bonding pads and the output wires can be reduced, which is effective in making the size of the package that encloses the semiconductor plate 1 smaller.

FIG. 3(b) shows a section structure of the semiconductor plate 1 at the dotted line A–A' of FIG. 3(a). It is preferable that the semiconductor mirror 5 is formed at the angle of 45 degrees to the mount surface for the laser chips 2. For example, processing of the mirror surface of a silicon plate is based on anisotropic etching that when etching is performed to a silicon (100) plane by an aqueous solution of potassium hydroxide series, the etching rate of a (111) plane relative to the (100) plane is slower by two digits, leading to the formation of a pyramid-shaped concave portions having a flat (111) plane as a slope. At this point, since the angle of the (111) plane relative to the (100) plane is about 54 degrees, the silicon plate with an off-angle of about 9 degrees, for example, whose crystallographic axis is tilted to the surface, needs to be used in order to form the semiconductor mirror of 45 degrees. However, the off-angle angle needs to be determined by taking into consideration the compatibility of semiconductor process for the photodetecting element and the electronic circuit formation as well. There are cases where the semiconductor mirror 5 is off from 45 degrees and where the emission direction of the laser beams 6a and 6b is off from the perpendicular direction of the semiconductor plate 1.

FIG. 4(a) shows the structure of the package 41 enclosing the semiconductor plate 1, FIG. 4(b) shows the sectional view at the broken line A–A', and FIG. 4(c) shows the sectional view at the broken line B–B'. 42 are the lead wires connected with the pad 34 of the semiconductor plate 1 with the bonding wires. In FIG. 4(c), the surface of the base 43 where the semiconductor plate 1 is mounted is tilted such that the emission direction of the laser beams 6a and 6b becomes perpendicular to the glass cover 44. In the case where the base 43 is not mounted in a tilted state, the entire base 43 may be arranged in the tilted state such that the centerline of the optical intensity distribution of the laser beam emitted from the package 41 becomes parallel with the optical path. 44 denotes the glass cover for closing the semiconductor plate 1, and the reflection plane 45 is provided inside the glass cover 44 for reflecting the peripheral portion of the laser beams 6a and 6b. The photodetecting element 9 of the semiconductor plate 1 receives the reflected beam by the reflection plane 45 to obtain a signal for monitoring the emission amount of the semiconductor laser chips 4a and 4b.

Figure 10:
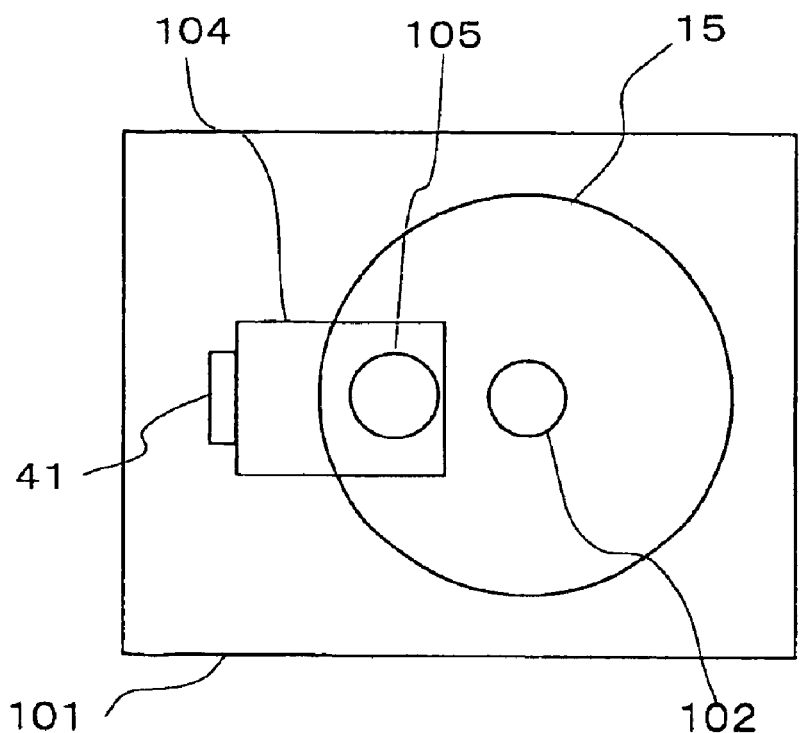
FIG. 10 is a view showing a constitution of an optical disk unit in the first embodiment.
Figure 10:
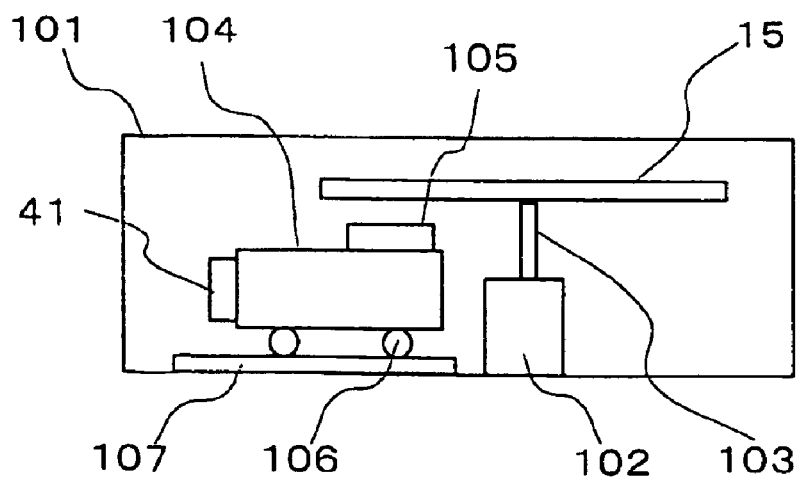

FIGS. 10(a) and 10(b) show the structure of the optical disk unit, in which 10(a) is a plan view and 10(b) is a side view. 101 denotes the case of the optical disk unit. 102 denotes the motor mounted on the case 101 of the optical disk unit to rotate the optical disk 15 via the shaft 103 which serves as a setting portion of the optical disk 15 as an optical information medium. 104 denotes the optical head where the package 41 enclosing the semiconductor plate 1 and the lens actuator 105 mounted with the focusing lens 13 are mounted. 106 denotes the access mechanism mounted on the optical head, and 107 denotes the rail mounted on the case 101 of the optical disk unit. The optical head 104 can move on the rail 107 by the access mechanism 106 in the radius direction of the disk 15. The collimating lens 10, the mirror 11 and the composite element 12 are inside of the optical head 104. The laser beam 6a or 6b radiated from the semiconductor laser chip 4a or 4b mounted on the package 41 is radiated from the optical head via the focusing lens 13 on the lens actuator 105, and radiated on a rotating optical disk 15. The reflected beam is incident to the optical head via the focusing lens 13 again, a part of which is received by the photodetecting element 7 mounted on the package 41 to obtain the focusing error detection signal. Moreover, another part is received by the photodetecting element 8 mounted on the package 41 to obtain the tracking error detection signal and information reproduction signal.

The principle of the present invention will be described with reference to FIGS. 5(a) to 5(e). FIGS. 5(a) and 5(b) are the optical path from the light source of the optical head to the focusing lens according to this embodiment shown in FIG. 1, which are sectional views including the mount surface for the laser chips 2 and substantial sectional views excluding the semiconductor mirror 5, mirror 11 and composite element 12. FIG. 5(a) shows the state where the semiconductor laser chips 4a and 4b are mounted accurately facing to the direction of the optical axis 51. Three solid lines show the laser beam 6a emitted from the semiconductor laser chip 4a to reach the entrance pupil plane 52 of the focusing lens 13, and particularly the central solid line 53a shows the central beam having the highest optical intensity. Three broken lines show the laser beam 6b emitted from the semiconductor laser chip 4b, and particularly the central solid line 53b shows the central beam having the highest optical intensity. Since the semiconductor laser chip 4a is on the optical axis 51, the central beam 53a is incident to the center of the focusing lens 13. On the other hand, since the semiconductor laser chip 4b is outside the optical axis 51, the central beam 53b, after going parallelly with the optical axis 51 to pass the collimating lens 10, meets the optical axis at a position equal to the focal distance of the collimating lens 10. Then, when the focusing lens 13 is arranged at the position where the central beam 53b meets the optical axis 51, the highest optical efficiency for the both laser beams is obtained, and thus little change occurs in the optical efficiency even if the focusing lens 13 is moved to either direction for the tracking servo. However, angle accuracy in mounting the laser chips is approximately ±1 to ±2 degrees. FIG. 5(b) shows the central beam 53a when the semiconductor laser chip 4a is mounted by tilting in the upward direction on the paper by θa degrees and the central beam 53b when the semiconductor laser chip 4b is mounted by tilting in the downward direction on the paper by θb degrees. Presuming that the tilt angle of the semiconductor laser chips 4a is θa, the tilt angle of the semiconductor laser chips 4ba is θb and the focal distance of the collimating lens 10 is fc, the central beam 53a separates from the optical axis 51 upward by fc*θa, and the central beam 53b separates from the optical axis 51 downward by fc*θb. presuming fc=20 mm, θa=2 degrees and θb=2 degrees, the gap between the central beam 53a and the central beam 53b becomes about 1.4 mm. If the focusing lens 13 is adjusted such that its central position meets the position of the central beam 53a in assembling the optical head, the optical intensity distribution of the laser beam 6a that is incident to the focusing lens 13 becomes centrosymmetrical as shown by the contour 54a of FIG. 5(c). Accordingly, little change occurs in the optical efficiency even if the focusing lens 13 is moved to either direction, as shown by the solid line 55a of FIG. 5(e), little change occurs in a recording power when the tracking servo is executed, and thus a stable recording can be achieved. On the other hand, since the entrance pupil diameter of the focusing lens 13 is approximately 4 mm, the central beam 53b of the laser beam 6b is off remarkably from the center of the focusing lens 13. Thus, the optical intensity distribution of the laser beam 6b becomes asymmetrical in the upward/downward directions on the paper as shown by the contour 54b of FIG. 5(c). If the focusing lens 13 is moved in the upward/downward direction on the paper of FIG. 5(d) for the tracking servo, the optical efficiency changes asymmetrically relative to the movement of the focusing lens 13 as shown by the dotted line of FIG. 5(e), and thus the stable information recording is difficult due to the fluctuation of the recording power. In the present invention, the tracking servo direction 14 is in the right and left direction on the paper of FIG. 5(d), there is little change of the optical efficiency relative to the movement of the focusing lens 13, and thus the stable information recording with little change of the recording power can be achieved.

Figure 6:
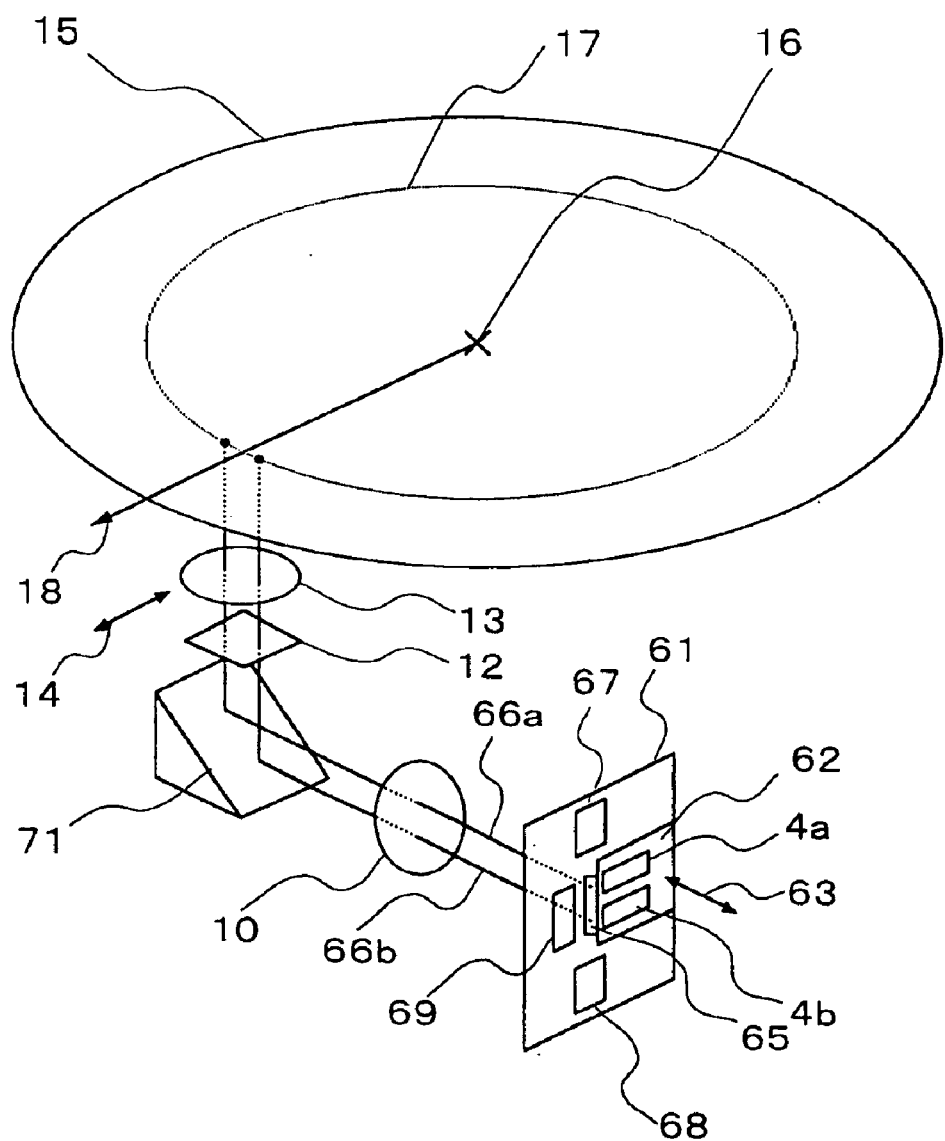
FIG. 6 is a view showing a constitution of a second embodiment of an optical disk unit and an optical head according to the present invention.

A second embodiment of the present invention will be described by using FIG. 6 to FIG. 9. FIG. 6 shows the constitution of the optical disk unit and the optical head using the present invention. Hereinafter, the parts with the same reference numeral as the first embodiment have the same function, and description of the function of these parts will be omitted. Reference numeral 61 denotes a semiconductor plate where the photodetecting element, the electronic circuit and the like are formed and the laser chips and the like are mounted thereon. Similarly to the semiconductor plate 1 of FIG. 1, the front surface cannot be seen actually because it is arranged facing its rear surface to a viewer, but the drawing shows in the phantom state where the plate is seen from the rear surface to the front surface. 62 denotes the mount surface for the laser chips, which is parallel with the surface of the semiconductor plate 61. The arrow 63 shows the normal direction of the mount surface for the laser chips 2. Similarly to the first embodiment, 4a denotes the semiconductor laser chip for the DVD, and 4b denotes the semiconductor laser chip for the CD-R. The semiconductor laser chips 4a and 4b are adhered on the mount surface for the laser chips by soldering or the like. 65 denotes the semiconductor mirror surface. The laser beam 66a for the DVD, after radiated from the semiconductor laser chip 4a to the left direction on FIG. 6 (the radius direction 18 of the recording medium in FIG. 6), is reflected by the semiconductor mirror surface 65, and becomes the parallel luminous flux by the collimating lens 10. The laser beam 66b for the CD-R, after radiated from the semiconductor laser chip 4b to the left direction on FIG. 6 (the radius direction 18 of the recording medium in FIG. 6), is also reflected by the semiconductor mirror surface 65, and becomes the parallel luminous flux by the collimating lens 10. 67 denotes the photodetecting element that obtains the focusing error detection signal, 68: the photodetecting element that obtains the tracking error detection signal and the information reproduction signal, 69: photodetecting element that monitors the light emission amount of the semiconductor laser chips 4a and 4b, and 67, 68 and 69 are severally formed on the surface of the semiconductor plate 61. 11 denotes the mirror that radiates the laser beams 66a and 66b on an information medium. 12 denotes the composite element in which a polarization four-division grating and a quarter-wave plate are adhered into a unit, 13: the focusing lens, 15: the optical disk for the DVD and optical disk for the CD-R and CD, 16: the rotation center of the optical disk 15, the circle 17 in a dotted line show the track to which information is recorded, 18: the radius direction of the optical disk 15, and 14: the tracking servo direction, which severally perform the same function as the composite element of the first embodiment. In this embodiment, the projected image in the tracking servo direction is reflected by the mirror 71 and the semiconductor mirror 65 to unify the normal direction 63 of the mount surface for the laser chips 62. Specifically, the mount surface for the laser chips 62 for mounting the semiconductor laser chips 4a and 4b is substantially perpendicular to the tracking servo direction 14. The characteristic of the second embodiment comparing to the first embodiment is that the laser beam 66a and 66b are incident from the disk circumference direction, which is perpendicular to the disk radius direction 18, to the mirror 71, and that the arrangement of the semiconductor plate 61 is rotated for 90 degrees from that of the semiconductor plate 1 for this purpose so that the semiconductor laser chip 4a and the semiconductor laser chip 4b are arranged in the optical head thickness direction (the vertical direction on the paper). These characteristics can be similarly realized if, for example, another mirror is inserted between the collimating lens 10 and the mirror 71 to make the laser beams 66a and 66b to be incident from the disk radius direction 18.

Figure 7:
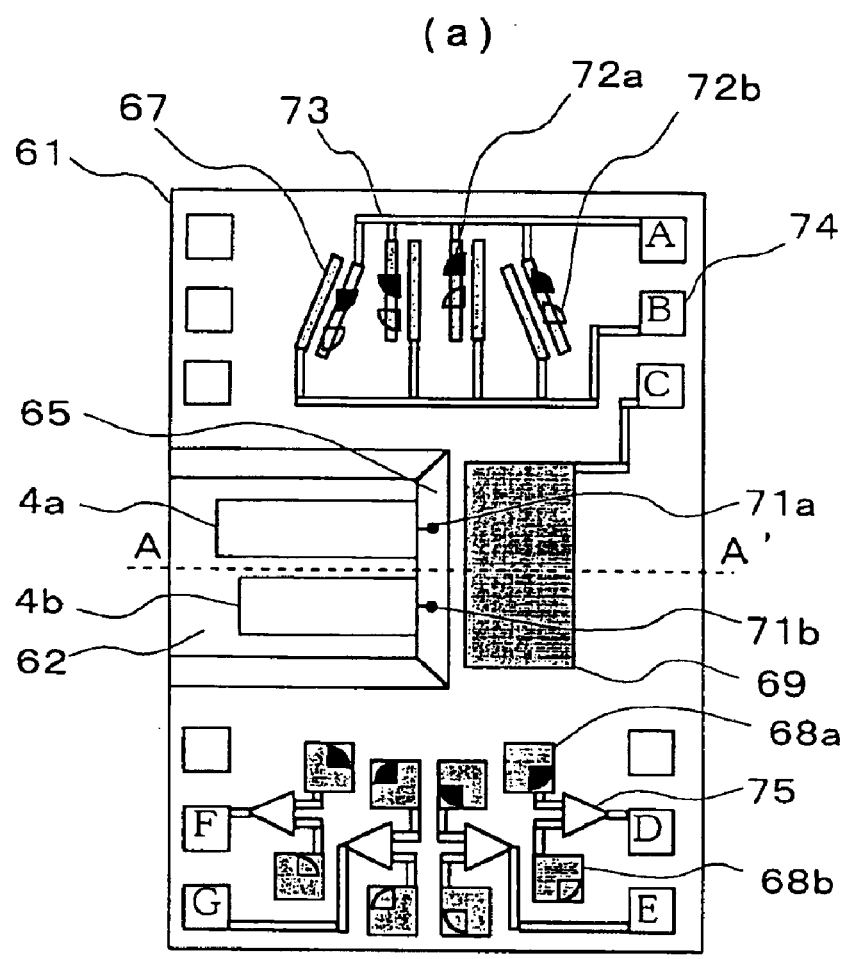
FIG. 7 is a view showing a constitution of a semiconductor plate in the second embodiment.
Figure 7:
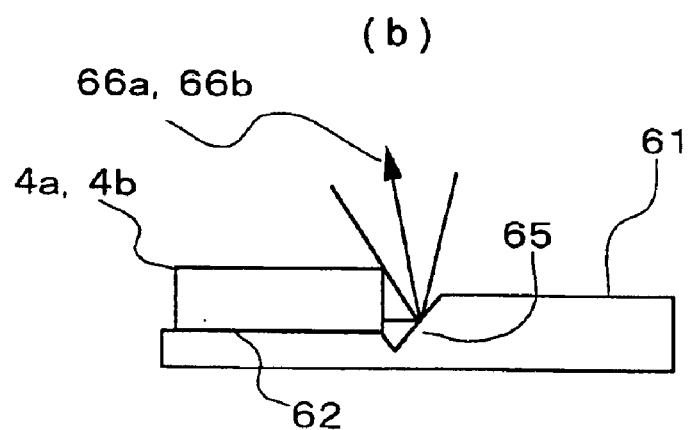
Figure 8:
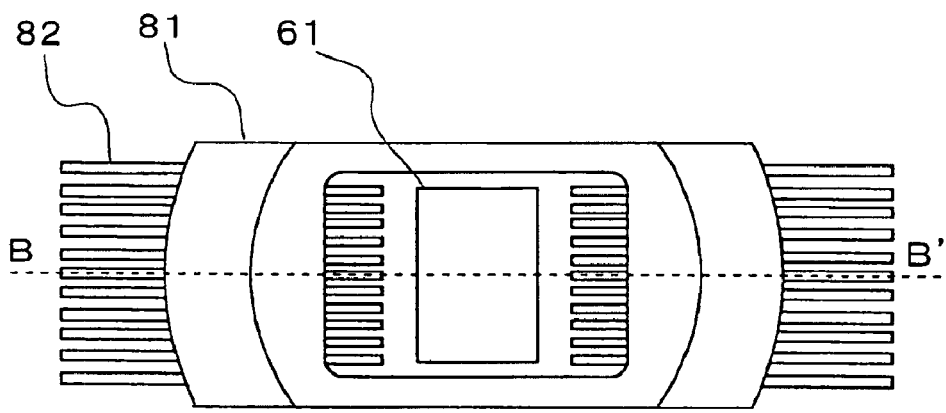
FIG. 8 is a view showing a constitution of a package in the second embodiment.
Figure 8:
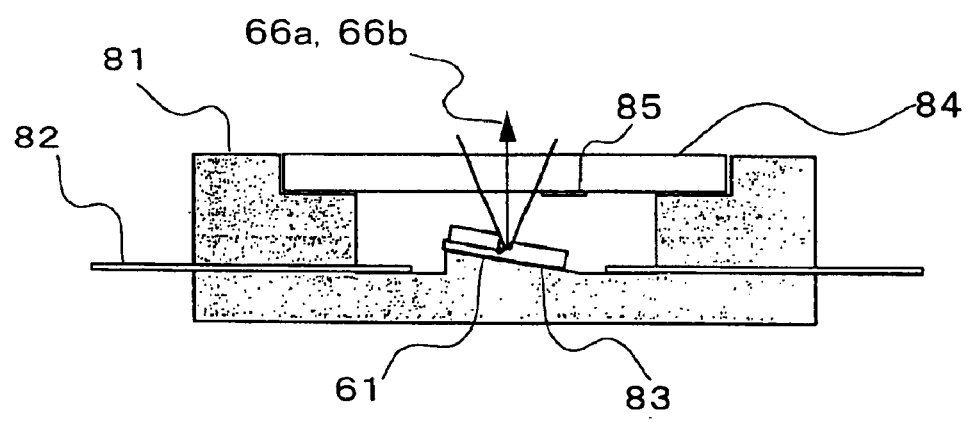

FIG. 7(a) shows the surface of the semiconductor plate 61 as seen from the collimating lens side. The eight pieces of quarter circles painted in black shown by the reference numeral 72a show the laser beams of the wavelength λa, which are separated by the grating of the composite element 12, and the eight pieces of quarter circles that are not painted shown by the reference numeral 72b show the laser beams of the wavelength λb, which are separated by the grating of the composite element 12. 67 denotes the photodetecting element for obtaining the focusing error detection signal, and it receives the laser beams 72a of the wavelength λa and the laser beams 72b of the wavelength λb. The knife edge method (Foucault method) by the four-division beams is used similarly to the first embodiment, a signal for subtraction is obtained from the A terminal and the B terminal of the wire bonding pad 74 when the photodetecting elements are connected by the conductive thin film 73 such as aluminum as shown in FIG. 7. The photodetecting elements shown by the reference numeral 68 in FIG. 6 for obtaining the tracking error detection signal and the information reproduction signal is constituted by 68a and 68b in detail. 68a denotes four photodetecting elements for receiving the laser beam 72a, and the 68b denotes four photodetecting elements for receiving the laser beam 72b. The output signal of the photodetecting elements 68a and 68b is input to the amplifier 75 formed on the semiconductor plate. The amplifier 75 outputs the signal of the photodetecting elements 68a to the D, E, F and G terminals of the pad 74 when the semiconductor laser chip 4a emits light, and outputs the signal of the photodetecting elements 68b to the D, E, F and G terminals of the pad 74 when the semiconductor laser chip 4b emits light. The photodetecting elements 67 of this embodiment can be commonly used by the beams with the different wavelengths, and the photodetecting elements 68 and the amplifiers 75 of this embodiment can be commonly used by the beams with the different wavelengths. Thus, not only the surface of the semiconductor plate 1 can saved, but also the number of the wire bonding pads and the output wires can be reduced, which is effective in making the size of the package that encloses the semiconductor plate 1 smaller.

FIG. 7(b) shows a section structure of the semiconductor plate 61 at the dotted line A–A' of FIG. 7(a). Although it is preferable that the semiconductor mirror 65 is formed at the angle of 45 degrees to the mount surface for the laser chips 62, there are cases where the semiconductor mirror 65 is off from 45 degrees and where the emission direction of the laser beams 66a and 66b is off from the perpendicular direction of the semiconductor plate 61.

FIG. 8(a) shows the structure of the package 81 enclosing the semiconductor plate 1, FIG. 8(b) shows the sectional view at the broken line B–B'. 82 are the lead wires connected with the pad 74 of the semiconductor plate 61 with the bonding wires. The surface of the base 83 where the semiconductor plate 61 is mounted is tilted such that the emission direction of the laser beams 66a and 66b becomes perpendicular to the glass cover 84. As described in the description of the first embodiment, even if the laser beams to be radiated are not perpendicular to the glass cover 84, they may be constituted so as to be parallel with the optical path irradiated substantially perpendicular to the optical disk to be irradiated. 84 denotes the glass cover for closing the semiconductor plate 61, and the reflection plane 85 is provided inside the glass cover 84 for reflecting the peripheral portion of the laser beams 66a and 66b. The photodetecting element 69 of the semiconductor plate 61 receives the reflected beam by the reflection plane 85 to obtain a signal for monitoring the emission amount of the semiconductor laser chips 4a and 4b.

Figure 11:
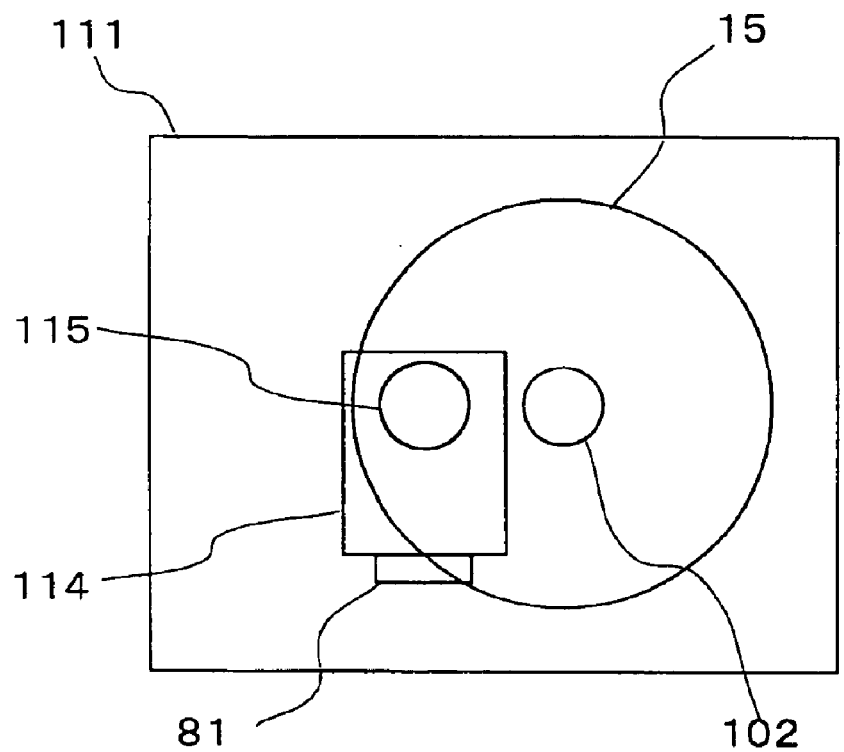
FIG. 11 is a view showing a constitution of an optical disk unit in the second embodiment.
Figure 11:
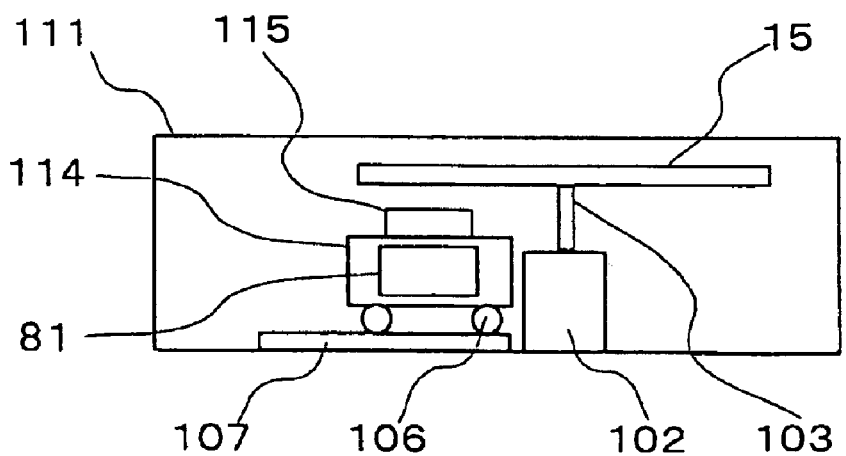

FIGS. 11(a) and 11(b) show the structure of the optical disk unit using the second embodiment of the present invention, in which 11(a) is a plan view and 11(b) is a side view. 111 denotes the case of the optical disk unit. 112 denotes the motor mounted on the case 111 of the optical disk unit to rotate the optical disk 15 via the shaft 103. 114 denotes the optical head where the package 81 enclosing the semiconductor plate 61 and the lens actuator 115 mounted with the focusing lens 13 are mounted. 106 denotes the access mechanism mounted on the optical head 114, and 107 denotes the rail mounted on the case 111 of the optical disk unit. The optical head 114 can move on the rail 107 by the access mechanism 116 in the radius direction of the disk 15. The collimating lens 10, the mirror 71 and the composite element 12 are inside of the optical head 114. The laser beam 66a or 66b radiated from the semiconductor laser chip 4a or 4b mounted on the package 81 is radiated from the optical head 114 via the focusing lens 13 on the lens actuator 115, and radiated on the rotating optical disk 15. The reflected beam is incident to the optical head 114 via the focusing lens 13 again, a part of which is received by the photodetecting element 67 mounted on the package 81 to obtain the focusing error detection signal. Moreover, another part is received by the photodetecting element 68 mounted on the package 81 to obtain the tracking error detection signal and information reproduction signal.

FIGS. 9(a) and 9(b) show the structure of the lens actuator used in this embodiment. FIG. 9(a) is a plan view as seen from the direction of the optical disk 15. 91 denotes the lens holder that mounts the focusing lens 13 and the coil 94, and is held by the holding block 93 by the spring 92. The magnet is next to the spring 92, and the magnet 95b and the holding block 93 are fixed to the optical head case. When a current is supplied to the coil 94, the electromagnetic force generated between the coil 94 and the magnet 95 makes the lens holder 91 move to the vertical direction on the paper, and thus the tracking servo can be performed. In the lens actuator of this kind, its dimensions become long from the focusing lens 13 to the holding block. On the other hand, in FIG. 1 and FIG. 6, since a motor (not shown) and the like are under the rotation center of the optical disk 15 for rotating the optical disk 15, the lens actuator is arranged such that the rotation center 16 of the optical disk 15 is positioned in the upper position on the paper taking into consideration that the optical head moves in the inner circumference of the optical disk 15.

FIG. 9(b) is a sectional side view of the lens actuator as seen from the horizontal direction. The solid line 97 shows the surface of the optical head case where the magnet 95, the holding block 93 and the like are fixed. The lens holder 91 is light weight and has the box structure to increase the rigidity of the portion holding the focusing lens 13. Particularly, the side plate portion 96 is necessary to increase the rigidity. The constitution is made such that the laser beams 66a and the 66b are incident from the right direction on the paper of FIGS. 9(a) and 9(b), that is, the disk circumference direction perpendicular to the disk radius direction, and are reflected by the mirror 71. Accordingly, in the second embodiment, the optical head and the optical disk unit can be made thin comparing to the first embodiment.

In this embodiment shown in FIG. 6, since the tracking servo direction 14 is substantially unified with the normal direction 63 of the mount surface for the laser chips 62, there is smaller change of the optical efficiency relative to the moving direction of the focusing lens as shown in FIG. 5(e), and thus the recording power reduces and the stable information recording can be achieved.

As described above, according to the present invention, in the laser module for recording information to the optical information medium or reproducing the information by using a plurality of the laser beam sources, the optical head including the laser module, or the optical information recording and reproduction apparatus that mounts the optical head, the laser module, the optical head or the optical information recording and reproduction apparatus can be realized in which the reduction and the change of the optical efficiency of each laser beam is small relative to the angle shift occurred during mounting the semiconductor laser chip and the movement of the focusing lens for the tracking servo.

INDUSTRIAL APPLICABILIY

As described above, the laser module, the optical head or the optical information recording and reproduction apparatus according to the present invention is effective for the light source having the laser beams with a plurality of different wavelengths. Thus, the light source is made to be a module, and it is possible to provide the optical head to which the light source as the module is assembled with high accuracy and the apparatus that records/reproduces the information by using the optical head with any of a plurality of the wavelengths.

What is claimed is:

1. An optical information recording and reproduction apparatus, comprising:
   a setting portion of an optical information medium;
   a light source where a plurality of semiconductor laser chips are mounted in a predetermined direction with respect to one another on an identical surface;
   optical convergence means for converging each of a plurality of laser beams radiated from each of laser chips into an optical spot on said optical information medium when the optical information medium is set to said setting portion; and
   tracking servo means for moving the optical convergence means in a tracking servo direction perpendicular to a track direction such that the optical spot accurately scans the track of the optical information medium,
   wherein the predetermined direction of mounting of said plurality of semiconductor laser chips with respect to one another extends substantially perpendicular to the tracking servo direction.

2. An optical information recording and reproduction apparatus according to claim 1 that comprises: a first reflection plane that reflects the laser beams radiated from each of the plurality of the semiconductor laser chips; and a second reflection plane that guides the laser beams from the first reflection plane to the optical convergence means,
   wherein the first reflection plane is formed on the same plate as the mount surface for the laser chips.

3. An optical information recording and reproduction apparatus according to claim 2,
   wherein the laser beams from the first reflection plane is made to be incident from the tracking servo direction to the second reflection plane, and
   a plurality of the semiconductor laser chips are arranged in an inner plane direction parallel to an optical information medium plane.

4. An optical information recording and reproduction apparatus according to claim 2,
   wherein the laser beams from the first reflection plane is made to be incident from the track direction to the second reflection plane, and
   a plurality of the semiconductor laser chips are arranged in an inner plane direction perpendicular to the optical information medium plane.

5. An optical information recording and reproduction apparatus according to claim 1,
   wherein photodetecting elements for receiving each of a plurality of the laser beams radiated from each of the laser chips are provided on a surface where said laser chips are mounted.

6. An optical head used in an optical information recording and reproduction apparatus that performs tracking servo to record and reproduces information when an optical spot is radiated on an optical information medium,
   wherein the optical head comprises:
   a light source on which each of a plurality of semiconductor laser chips having a plurality of wavelengths is mounted on an identical surface so that the laser chips are mounted side-by-side with respect to one another in a predetermined direction of mounting; and
   optical convergence means for converging each of a plurality of laser beams radiated from each of the laser chips on said optical information medium as the optical spot, and the predetermined direction of side-by-side mounting of said plurality of semiconductor laser chips with respect to one another extends substantially perpendicular to said tracking servo direction.

7. An optical head according to claim 6, comprising:
   a first reflection plane for reflecting the laser beam radiated from each of a plurality of the semiconductor laser chips; and
   a second reflection plane for guiding the laser beam from the first reflection plane to the optical convergence means;
   wherein the first reflection plane is formed on a plate which is the same as the mount surface for the laser chips.

8. An optical head according to claim 7,
   wherein the laser beams from the first reflection plane is made to be incident from the tracking servo direction to the second reflection plane, and
   a plurality of the semiconductor laser chips are arranged in an inner plane direction parallel to an optical information medium plane.

9. An optical head according to claim 7,
   wherein the laser beams from the first reflection plane is made to be incident from the track direction to the second reflection plane, and
   a plurality of the semiconductor laser chips are arranged in an inner plane direction perpendicular to the optical information medium plane.

10. An optical head according to claim 6,
    wherein a photodetecting element for receiving each of a plurality of the laser beams radiated from each of the laser chips is provided on a surface where said laser chips are mounted.

11. An optical information recording and reproduction apparatus, comprising:
    a setting portion of an optical information medium;
    a light source where a plurality of semiconductor laser chips are mounted on an identical surface;
    optical convergence means for converging each of a plurality of laser beams radiated from each of laser chips into a respective optical spot on said optical information medium when the optical information medium is set to said setting portion; and
    tracking servo means for moving the optical convergence means in a tracking servo direction perpendicular to a track direction such that the optical spot accurately scans the track of the optical information medium;
    wherein a line extending between the optical spots which are spaced from one another along a direction of the track and are formed on the optical information medium by respective ones of the laser beams radiated from the laser chips mounted on the identical surface extends substantially perpendicular to the tracking servo direction; and wherein a predetermined direction of mounting of said plurality of laser chips with respect to one another extends substantially perpendicular to the tracking servo direction.

* * * * *